(12) United States Patent
Sijstermans et al.

(10) Patent No.: US 6,728,874 B1
(45) Date of Patent: Apr. 27, 2004

(54) SYSTEM AND METHOD FOR PROCESSING VECTORIZED DATA

(75) Inventors: Frans W. Sijstermans, Los Altos, CA (US); Evert-Jan D. Pol, Valkenswaard (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 528 days.

(21) Appl. No.: 09/685,441

(22) Filed: Oct. 10, 2000

(51) Int. Cl.[7] .................................................. G06F 7/00
(52) U.S. Cl. ............................ 712/300; 712/222; 712/4
(58) Field of Search ................................ 712/222, 300, 712/4

(56) References Cited

U.S. PATENT DOCUMENTS 5,903,779 A * 5/1999 Park ............................. 712/300
5,933,650 A * 8/1999 van Hook et al. ............... 712/2

* cited by examiner

Primary Examiner—William M. Treat
(74) Attorney, Agent, or Firm—Fenwick & West LLP (57) ABSTRACT

A method and system for correctly processing both big endian and little endian vector data. If the vector has a little endian data order, each piece of data (such as a byte) within the vector is processed in order. If the vector has a big endian data order, each vector element is processed in order, but each piece of data within each vector element is processed in reverse order.

35 Claims, 9 Drawing Sheets

| Address | Big Endian Representation of 1025 | Little Endian Representation of 1025 |
|---|---|---|
| 00 | 00000000 | 00000001 |
| 01 | 00000000 | 00000100 |
| 02 | 00000100 | 00000000 |
| 03 | 00000001 | 00000000 |

| Address | Big Endian Representation | Incorrect Little Endian Representation | Correct Little Endian Representation |
|---|---|---|---|
| 00 | 00000100 | 00000000 | 00000001 |
| 01 | 00000001 | 00000100 | 00000100 |
| 02 | 00000100 | 00000001 | 00000000 |
| 03 | 00000000 | 00000100 | 00000100 |

SYSTEM AND METHOD FOR PROCESSING VECTORIZED DATA

BACKGROUND

A. Technical Field

The present invention relates generally to computer data processing, and more particularly, to a system and method for processing both big endian and little endian vector data.

B. Background of the Invention

Computer data typically comes in two modes: "big endian" and "little endian." The terms "big endian" and "little endian" refer to which addresses of pieces of information are most significant. In big endian computer architectures, the pieces of information with the lowest addresses are the most significant. In little endian architectures, the pieces of information with the highest addresses are the most significant.

For example, consider data that consists of four bytes. In a big endian scheme, the most significant byte is at address "a." Address "a+1" has the second most significant byte, address "a+2" has the third most significant byte, and address "a+3" has the least significant byte. In contrast, in a little endian scheme, the least significant byte is at address "a." Address "a+1" has the second least significant byte, address "a+2" has the third least significant byte, and address "a+3" has the most significant byte.

Figure 1:
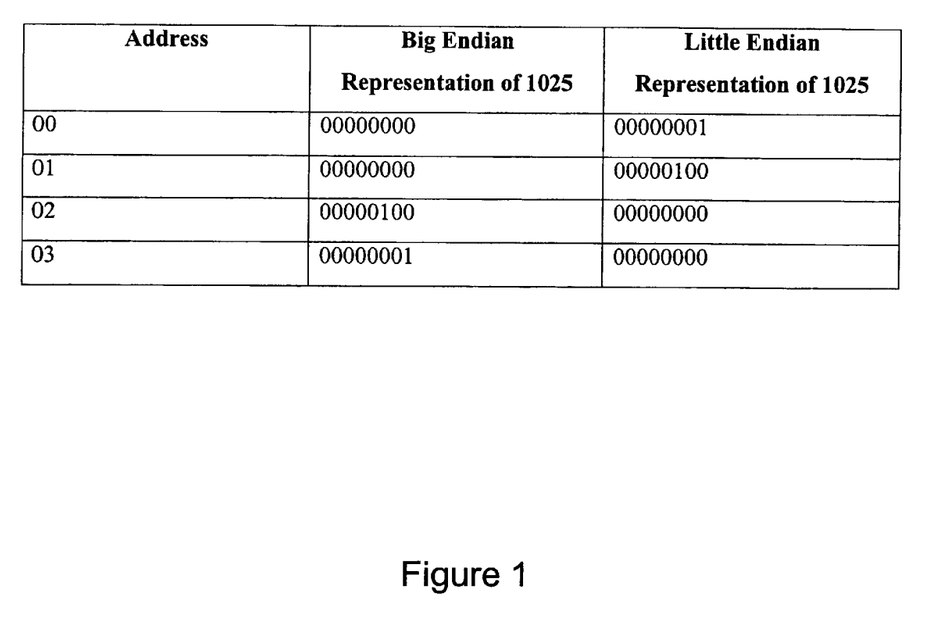
FIG. 1 is a table that shows an example of big endian and little endian orders

FIG. 1 is a table that shows an example of big endian and little endian orders, depicting the number 1025 (2 to the tenth power plus one) stored in a 4-byte integer: 00000000 0000000 00000100 00000001.

Since big endian and little endian data have different orders, a system cannot treat big endian and little endian data in the same manner. For example, if a system treated big endian data as little endian data, the system would end up treating the information at address "a" as the least significant data, when it should be treating that data as the most significant. This treatment would result in errors. Therefore, systems must use only one sort of data, big endian or little endian, or have different provisions to deal with both big endian and little endian data.

Figure 2A:
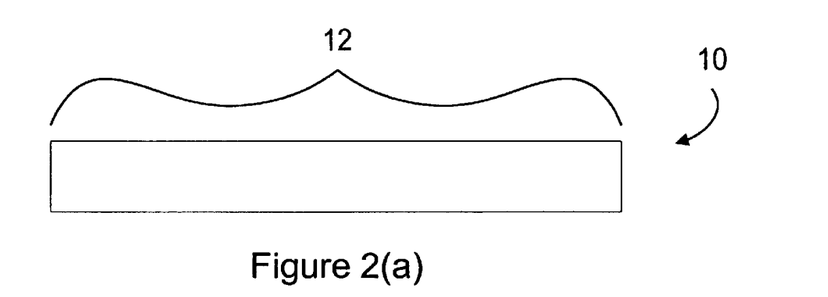
Figure 2B:
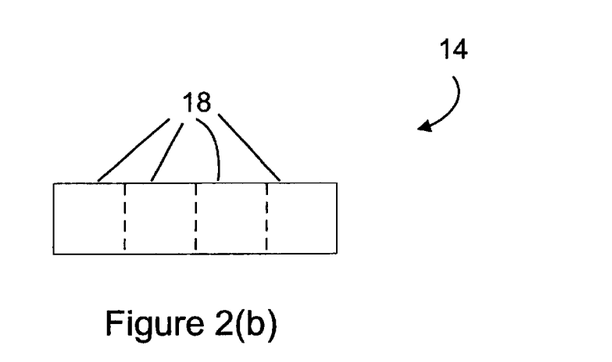
Figure 2C:
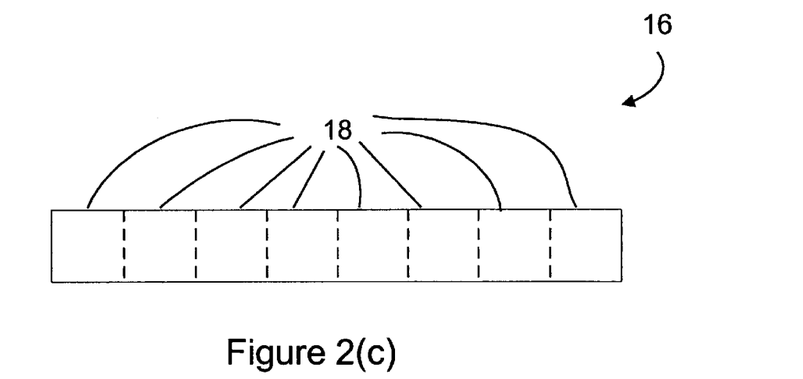

When the data is scalar, it is fairly simple to deal with both big endian and little endian data. FIGS. 2(a) through 2(c) show an example of scalar data. As seen in FIG. 2(a), "scalar" data means that the data piece 10 only contains one data item 12. The entire data piece 10 is taken up by the data item 12. That data item 12 could be the number 1025, as in the example above. As shown in FIG. 2(b), the data piece could be a 32-bit data piece 14 with four bytes 18. As shown in FIG. 2(c), the data piece could be a 64-bit piece 16, with eight bytes 18, or any other size piece, depending upon the architecture of the system.

Big endian scalar data can easily be converted into little endian scalar data, and little endian scalar data can easily be converted into big endian scalar data. Reversing the order of the data accomplishes this. That is, swapping the information at the first address with the information at the last address, swapping the information at the second address with the information at the second to last address, and continuing in such a manner until all the data has swapped addresses.

This can be seen with the above example, shown in FIG. 1, of the number 1025 stored in a 4-byte integer. To convert the big endian representation to the little endian representation, the information in the first and last addresses (addresses 00 and 03) are swapped, and the information in the second and second-to-last addresses (addresses 01 and 02) are swapped.

Figure 3A:
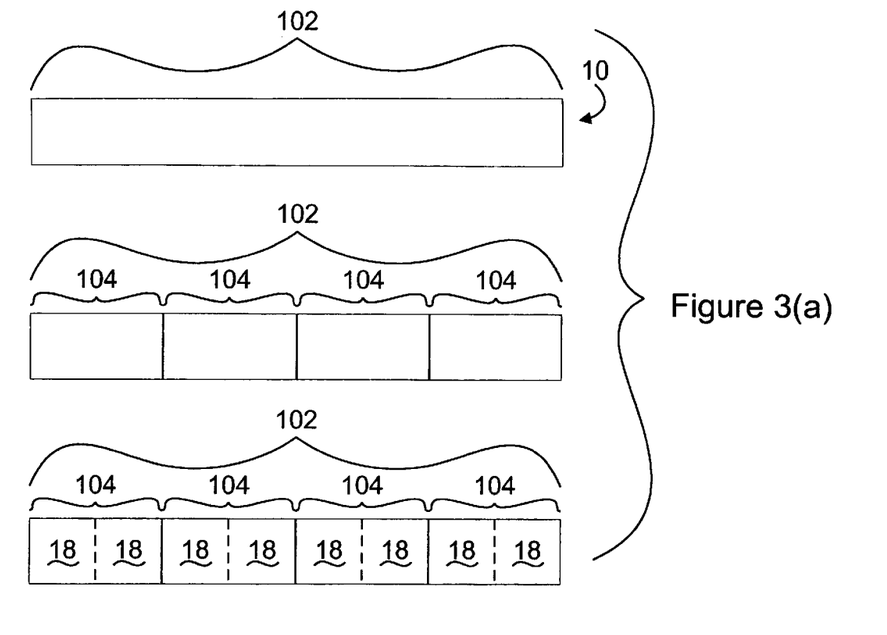
Figure 3B:
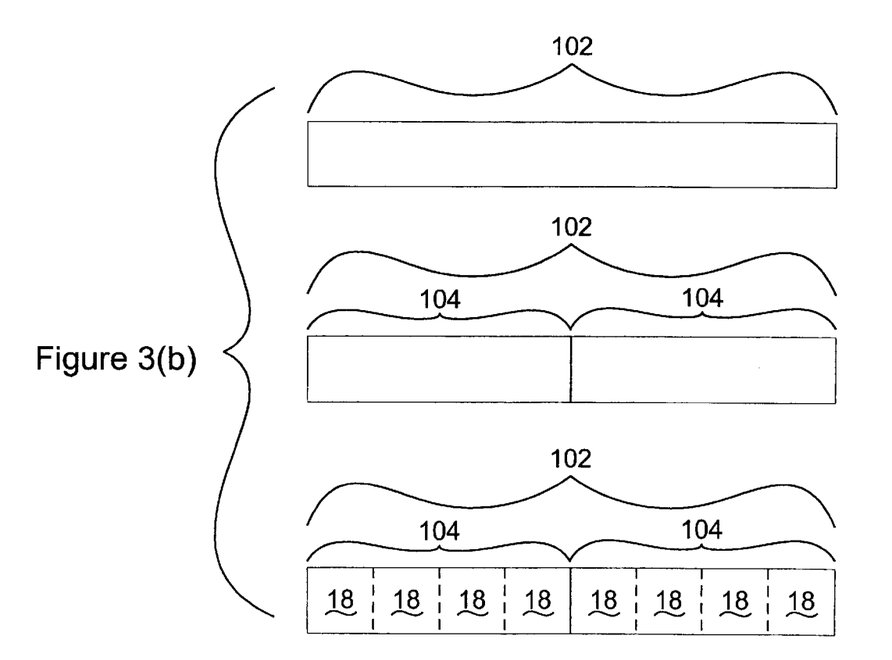

However, such a simple technique does not work with vector data. Fairly recently, computer systems, processors, and other systems have been designed with larger instruction sets that allow vector data. FIGS. 3(a) and 3(b) show examples of vector data. With vector data, the data piece 10 is a vector 102. The vector 102 can be any size, determined by the architecture of the system: in a 32-bit architecture, the vector 102 would be 32-bits, in 64-bit architecture, the vector 102 would be 64-bits, and so forth. While scalar data only has one data item 12 within the data piece 10, in vector data, the vector 102 can be divided into a number of separate data items, or "vector elements" 104. Each of these vector elements 104 can represent a separate piece of data. For example, a first vector element 104 within a vector 102 could represent the number 1025, while a second vector element 104 within the same vector 102 could represent the number 1024.

The vector elements 104 are in turn made up of one or more smaller data items. These smaller data items are typically bytes 18, as depicted in FIGS. 3(a) and 3(b). However, other data units, such as bits, could be used as well. While the term "bytes" is used for the smaller data items, the term "bytes" includes any smaller data units that could be used to make up the vector elements, and the smaller data units are not limited to bytes.

FIG. 3(a) shows an example of a 64-bit vector 102 with four vector elements 104 of two bytes 18 each. FIG. 3(b) shows an example of a 64-bit vector 102 with two vector elements 104 of four bytes 18 each.

Vector data can be of any size. For example, with 64-bit architecture, there could be eight vector elements 104 of one byte each, four vector elements of two bytes each, two vector elements of four bytes each, or one vector element of eight bytes. The vector data could be 32-bit, 128-bit, or any other size as well. Additionally, each vector element could be made of numbers of bits or any other units instead of bytes. Depending on the size of the smaller units, there could be different numbers and sizes of vector elements within each vector.

The simple swapping method that works to convert big endian scalar data to little endian scalar data does not work with vector data. With vector data, the vector elements are located in the same place for both big endian and little endian data modes. Only the data within each vector element is located at different addresses, depending on whether the data is big endian or little endian. If the conversion method for scalar data were used on vector data, the vector elements' positions would be swapped, when all that is desired is for the data within each vector to be swapped.

Figure 4:
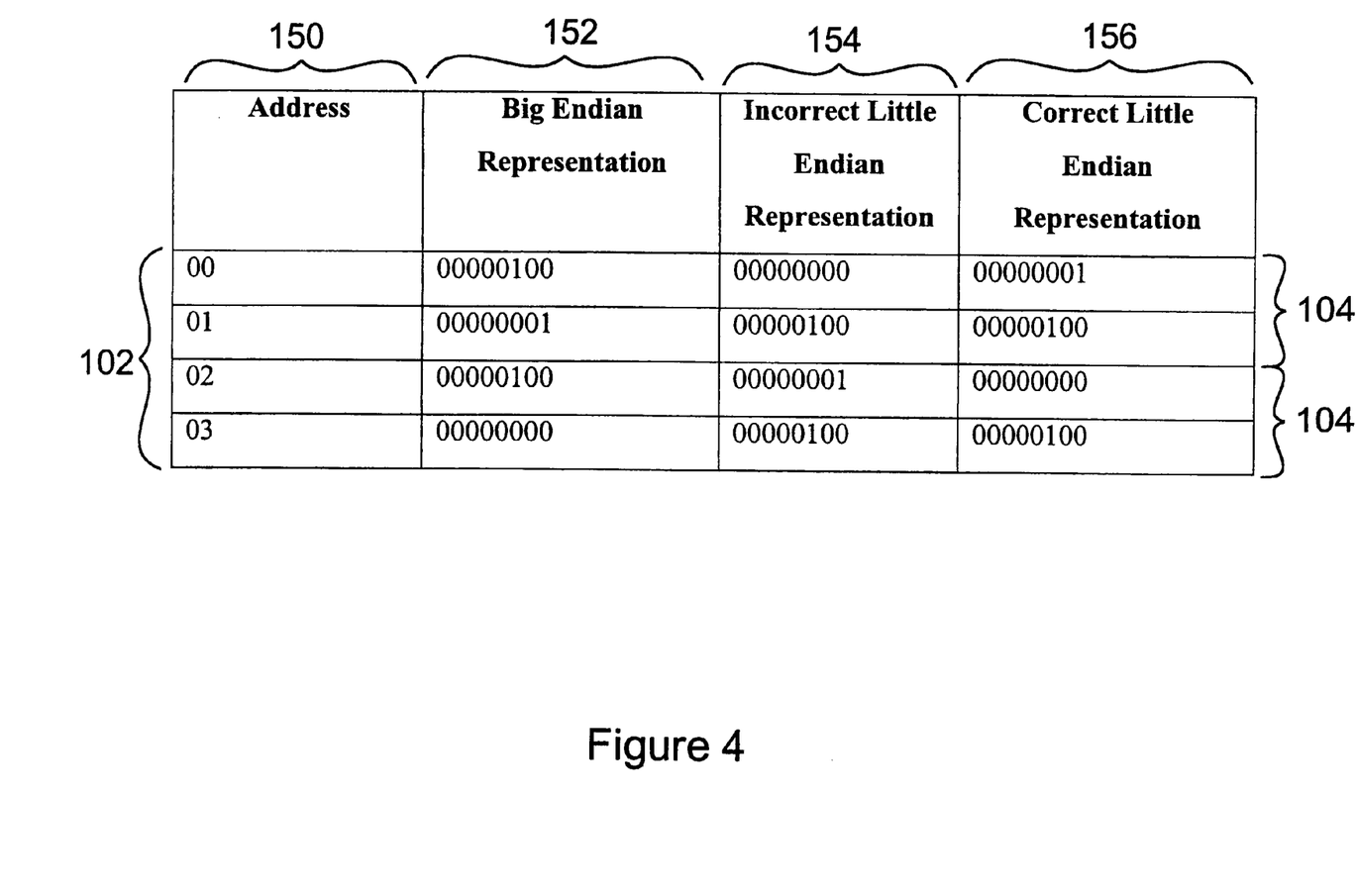
FIG. 4 is a table showing the incorrect results from swapping the byte order.

FIG. 4 is a table showing the incorrect results from simply swapping the byte order. The table depicts a vector 102 of two vector elements 104, each vector element 104 consisting of two bytes. The number 1025 is stored in the first vector element 104. The number 1024 is stored in the second vector element 104. The first column 150 shows the address of each byte. The second column 152 shows the big endian representation of numbers 1025 and 1024. As seen in the third column 154, if the last byte (byte 03) were swapped with the first byte (byte 00) to convert between big endian and little endian vector data, the result would be an incorrect little endian representation. The fourth column 156 shows the correct little endian representation.

Previously, to enable the use of both big endian and little endian vector data in systems, two versions of the software used on the systems were written, one version for big endian vector data, and one version for little endian vector data. Producing and using two versions of each piece of software is wasteful and expensive.

Accordingly it is desirable to provide a method and system that treats both big endian vector data and little endian vector data correctly.

SUMMARY OF THE INVENTION

The present invention offers a method and system that treats both big endian vector data and little endian vector data correctly. The present invention would typically be implemented in a computer processor. By processing both big endian and little endian vector data correctly, such a processor has the flexibility to deal with both types of data, without the necessity of creating software programs to separately deal with each data order.

To process the vector data, one embodiment of the method involves determining whether the vector data has a big endian or little endian data order. In one embodiment, if the vector has a little endian data order, each piece of data (such as a byte) within the vector is processed in order. If the vector has a big endian data order, each vector element is processed in order, but each piece of data within each vector element is processed in reverse order.

In another embodiment, the opposite is true. If the vector has a big endian data order, each piece of data within the vector is processed in order. If the vector has a little endian data order, each vector element is processed in order, but each piece of data within each vector element is processed in reverse order.

Another embodiment of the invention is a load/store operation that transfers data between memory and register. When vector data is to be transferred from memory to register, the order of the vector data is determined. If the vector has a little endian order, the small data pieces (such as bytes) within the vector are transferred to the registers such that they remain in the same order they had in the memory. If the vector has a big endian order, the vector elements are transferred to the registers such that remain in the same order they had in the memory, but the small data pieces (such as bytes) are transferred to the registers such that they have the opposite order within the vector element that they had in the memory. Again, big endian and little endian vectors can be treated in the opposite manner.

Another embodiment of the invention is a processor with instructions for correctly processing both big endian and little endian vector data. If the vector has a little endian data order, the correct process instruction for processing little endian data is called, and each piece of data (such as a byte) within the vector is processed in order. If the vector has a big endian data order, the correct process instruction for processing big endian data is called, and each vector element is processed in order, but each piece of data within each vector element is processed in reverse order.

BRIEF DESCRIPTION OF THE DRAWINGS

FIGS. 2(*a*), 2(*b*), and 2(*c*) show examples of scalar data.

FIG. 3(*a*) and 3(*b*) show examples of vector data.

FIGS. 6(*a*) and 6(*b*) show the correct processing of vector data in little endian order FIGS. 7(*a*) through 7(*f*) show the correct processing of vector data in big endian order.

FIGS. 8(*a*) through 8(*d*) show examples of the correct location of vector data in memory and in the register.

DETAILED DESCRIPTION OF EMBODIMENTS

Figure 5:
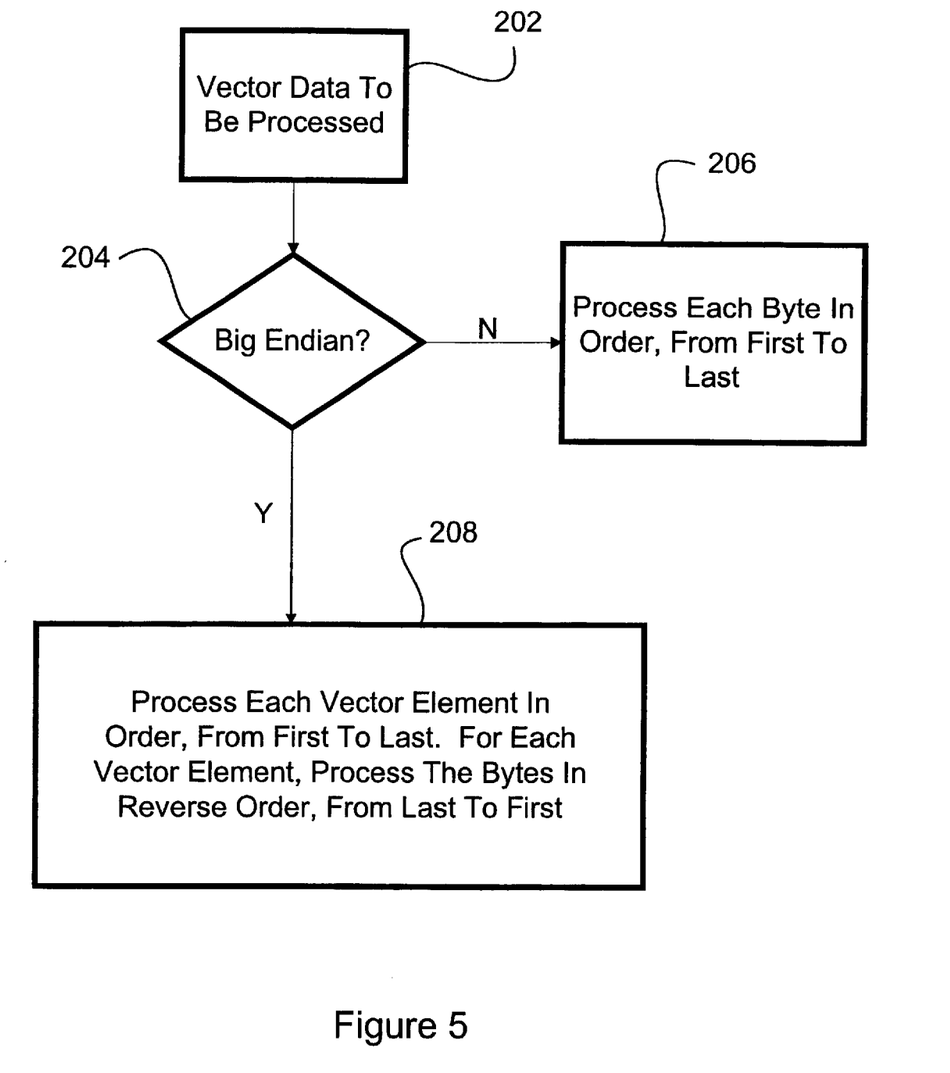
FIG. 5 is a flow chart of a method for processing vector data.

FIGS. 1 through 4 were discussed previously. FIG. 5 is a flow chart showing the processing of vector data in accordance with one embodiment of the invention. Examples of this processing could be load and store operations between the register and data cache.

The processing of vector data occurs in a computer processor, such as a CPU or other type of processor. In one embodiment, the processor has an instruction set that allows both big endian and little endian vector data to be used.

In the first step 202, there is vector data to be processed. The size of this vector depends upon the processor architecture. If the system has 64-bit architecture, the vector will be 64 bits. If the system has 128-bit architecture, the vector will be 128 bits. Any size vector can exist. This vector may be in big endian or little endian order. The vector has one or more vector elements. The vector elements, in turn, have one or more data units. In a preferred embodiment, the data units in the vector elements are bytes. However, the data units may be bits or some other data unit. While the term "bytes" is used to refer to the data units that make up the vector elements, other data units besides actual bytes may be used as well. The term "bytes" does not limit the system or method to vector elements made up of bytes, but instead includes to any data units that make up the vector elements.

In step 204, the system determines whether the vector is big endian. In one embodiment, the system includes a byte sex flag in that indicates whether the vector is big endian or little endian. In a preferred embodiment, the byte order in the registers is fixed; the load and store operations may need to swap the byte order of data being loaded and stored in the registers, depending on the byte order of the data being loaded and stored. The endianness of the vector big endian or little endian—determines which process instruction is called to process the vector. For example, if a 64-bit vector is big endian, with four vector elements of sixteen bits each (a "be |4×16" vector), the vector will be identified as a be |4×16 vector, and the correct process instructions for processing a big endian vector would be called, as detailed below. In contrast, if the same 64-bit vector is little endian, with the same four vector elements of sixteen bits each (a "le |4×16" vector), the vector will be identified as a le |4×16 vector, and correct process instructions for processing a little endian vector would be called, as detailed below.

If the answer in step 204 is no, and the vector is little endian, the system will process each byte in the vector in order in step 206, starting at the first data address and continuing to the last address in the data item. This processing is detailed further below.

If the answer is yes, and the vector is big endian, the system will process the vector in step 208. For big endian data, the vector elements are processed in order, from first to last. However, within each vector element, the data is processed in reverse order, from last to first. This processing order is detailed below.

Figure 6A:
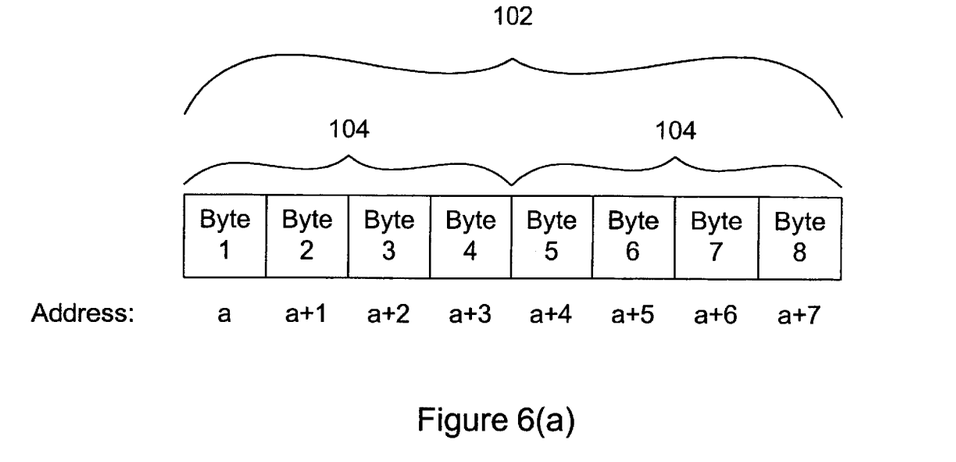
Figure 6B:
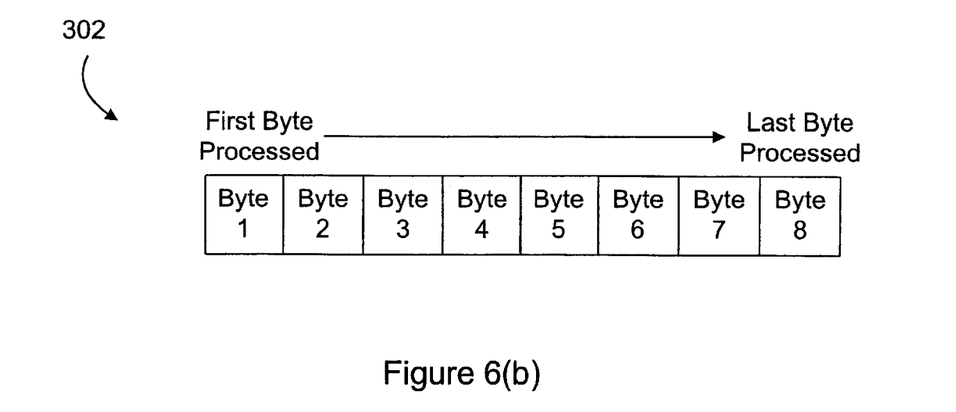

FIGS. 6(*a*) and 6(*b*) provide further detail for step 206, showing the correct processing of vector data in little endian order. FIG. 6(*a*) shows an example piece of data consisting of a vector 102 with two vector elements 104, each vector element 104 having four bytes. The bytes are located at addresses "a" through "a+7." The correct processing order is to start with the first byte, byte 1, located at address "a," and process each succeeding byte in order through to the last byte, byte 8, located at address "a+7." Thus, FIG. 6(*b*) shows the correct processing order 302 of the bytes.

FIGS. 7(*a*) through 7(*f*) provide further detail for step 208, showing the correct processing of vector data in big endian order. The system determines the number and size of vector elements in the vector to be processed. In some systems, the number and size of the vector elements are identified and the correct processing instructions for the number and size of vector elements are called. For example, if a 64-bit vector is big endian, with four vector elements of sixteen bits each (a "be |4×16" vector), the vector would be identified as having four vector elements of 16 bits each, and the correct process instructions for processing such a vector would be called. In the case of a "be |4×16" vector being moved from memory to register, the correct processing is shown in FIG. 8(*b*) and discussed below. If a 64-bit vector is little endian, with two vector elements of thirty-two bits each (a "le |2×32" vector), the vector would be identified as having two vector elements of thirty-two bits each, and the correct process instructions for processing that vector would be called. In the case of a "le |2×32" vector being moved from memory to register, the correct processing is shown in FIG. 8(*a*) and discussed below.

In FIG. 7(*a*), the data consists of a vector 102 with two vector elements, a first vector element 402 and a second vector element 404, each vector element having four bytes, although any size vector with any number of vector elements could exist. The bytes, numbered "Byte 1" through "Byte 8" are located at addresses "a" through "a+7." With big endian data, each vector element is processed in order, from first to last. Thus, FIG. 7(*b*) shows the first vector element 402, with bytes at the first four addresses, and consisting of bytes 1–4, is processed first.

Figure 7A:
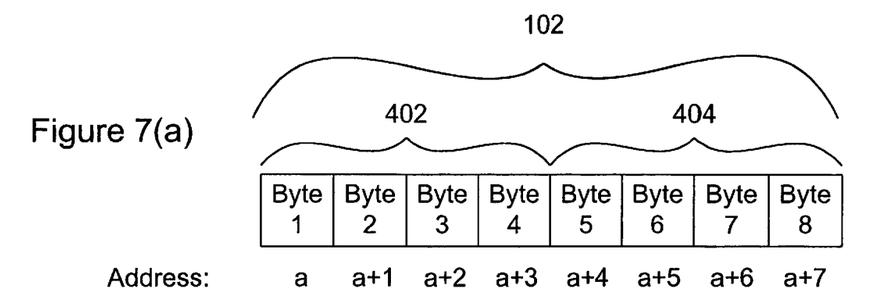
Figure 7B:
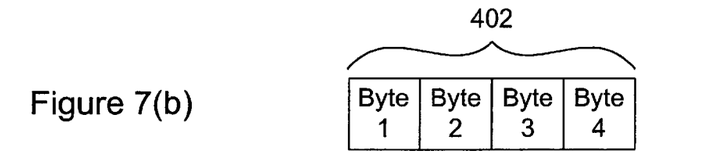
Figure 7C:
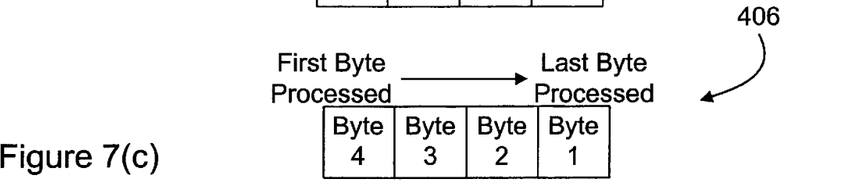
Figure 7D:
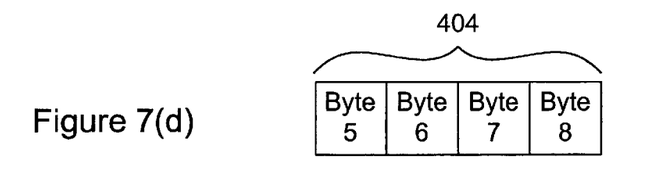
Figure 7E:
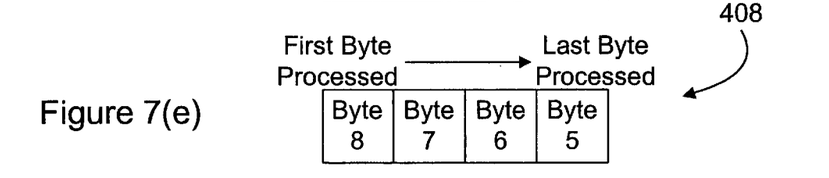
Figure 7F:
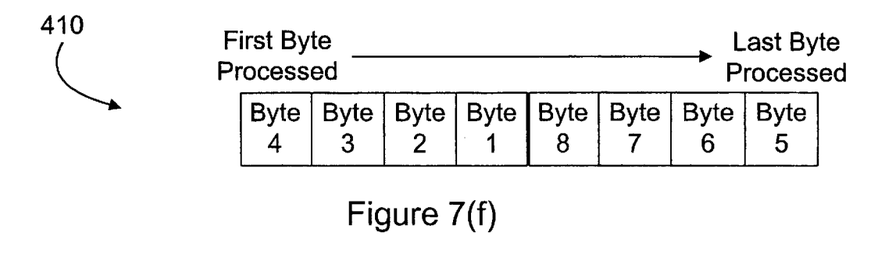

Within the first vector element 402, the bytes are processed in reverse order, from last to first. Thus, Byte 4, located at address "a+3" is processed first. As shown in FIG. 7(*c*), the correct processing order 406 for the first vector element 402 is Byte 4, Byte 3, Byte 2, and finally Byte 1.

Because the vector elements are processed in order, the second vector element 404, shown in FIG. 7(*d*), is processed next. In the example in the figure, there are only two vector elements, but even if there were more than two vector elements, the second vector element 404 is the next vector element in order and would be processed next. Again, as with the first vector element 402, the bytes within the second vector element 404 are processed in reverse order, from last to first. In this case, that means that Byte 8, located at address "a +7" is processed first. As shown in FIG. 7(*e*), the correct processing order 408 of the second vector element 104 is Byte 8, Byte 7, Byte 6, and Byte 5.

The resulting overall correct order of processing 410 is shown in FIG. 7(*f*). As seen in the figure, the complete order of processing 410 for the bytes is: Byte 4, Byte 3, Byte 2, Byte 1, Byte 8, Byte 7, Byte 6, and Byte 5. It is evident from FIG. 7(*f*) that, even with big endian data, the first vector element, which consists of the first four byte locations, is processed first. The second vector element, which consists of the last four byte locations is processed last. This results in the last byte, Byte 8, being processed fifth. In contrast, had the data been scalar instead of vector data, the swapping process described above would result in the last byte, Byte 8, being processed first, causing errors.

In a preferred embodiment, the order of processing determines the location of data. For example, one situation where big and little endian vector data must be treated correctly is when a CPU performs load and store operations to transfer data from the data cache or memory to the register, or vice versa. In such a case, the method detailed above results in the correct final location of the data. The method above processes the data in the correct order. By using the correct order of processing, the data ends up in the correct location, since the order of processing determines the data location. Correct location of data is discussed further below.

Note that the processing method above is described where the little endian bytes are processed in order from first to last, and big endian data has the vector elements processed in order and the bytes within each vector element processed in reverse order. However, big endian and little endian vector data can also be processed in the opposite manner. In some systems, it will be desirable to process big endian bytes in order from first to last. In such a case, the vector elements of the little endian data will be processed in order, with the bytes within each vector element being processed in reverse order.

Thus, some embodiments involve the process described above for little endian data instead being applied to big endian data, and the process described above for big endian data instead being applied to little endian data.

FIGS. 8(*a*) through 8(*d*) detail the location of data in memory and in the register when a CPU performs load and store operations to transfer data between the register and data cache or memory. FIGS. 8(*a*) through 8(*d*) show 64-bit data with eight bytes. However, the concepts shown by the figures are applicable to any size data. Further, FIGS. 8(*a*) through 8(*d*) show data moving from memory to register. To move data from register to memory, the process is reversed: simply reverse the direction of the arrows in the figures to determine where data from the registers would end up in the memory.

As stated above, the location of the big endian and little endian vector data within the register and data cache or memory during such an operation is important. Depending on whether the data is big endian or little endian, the location may have to be swapped. Such a swap would preferably be done by the processing order method described above.

In a preferred embodiment, the processing order determines the location of data in the register. The first byte to be processed goes into the first register location. The second byte to be processed goes into the second register location. Each successive byte to processed goes into the next register location. Therefore, the processing order method described above places the big endian and little endian data in the correct locations in the register.

FIG. 8(*a*) shows the addresses of vector data in memory, and the corresponding location of the vector data when it has been loaded into the register in a load/store operation. In FIG. 8(*a*), the data is either little endian or big endian where the data vector has the maximum number of vector elements 104. In the figure, the data is 64-bit data consisting of 8 bytes. The big endian data has eight vector elements 104 of one byte each. This is the maximum number of vector elements 104 possible if each vector element 104 must be at least one byte. In such a case, the location of each byte or vector element 104 in both memory and register will be the same for both little endian data and big endian data where the data vector has the maximum number of vector elements 104. In either of those cases, the order that the data is stored in memory remains the same when the data is loaded into the register. Byte 1, at the first memory address, address "a," goes to the first register location, location "0." Byte 2, at the second memory address, "a+1," goes to the second register location, "1." Each succeeding byte in each next memory address goes to each next succeeding location in the register.

FIG. 8(*b*) shows the location of vector data in memory and the corresponding location of the vector data in the register for a 64-bit vector having four vector elements 104 of two bytes each. In this case, each pair of bytes is swapped. For the first two bytes, the byte in the first memory address goes to the second register location, and the byte in the second memory address goes to the first register location. The order of the third and fourth bytes, fifth and sixth bytes, and seventh and eighth bytes in the memory are similarly swapped in the register, as seen in FIG. 8(*b*).

Figure 8A:
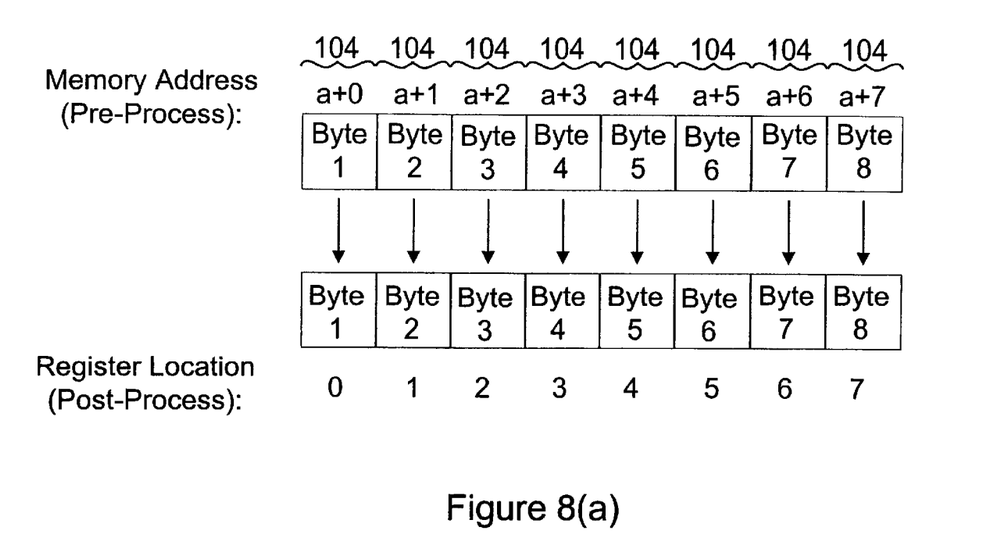
Figure 8B:
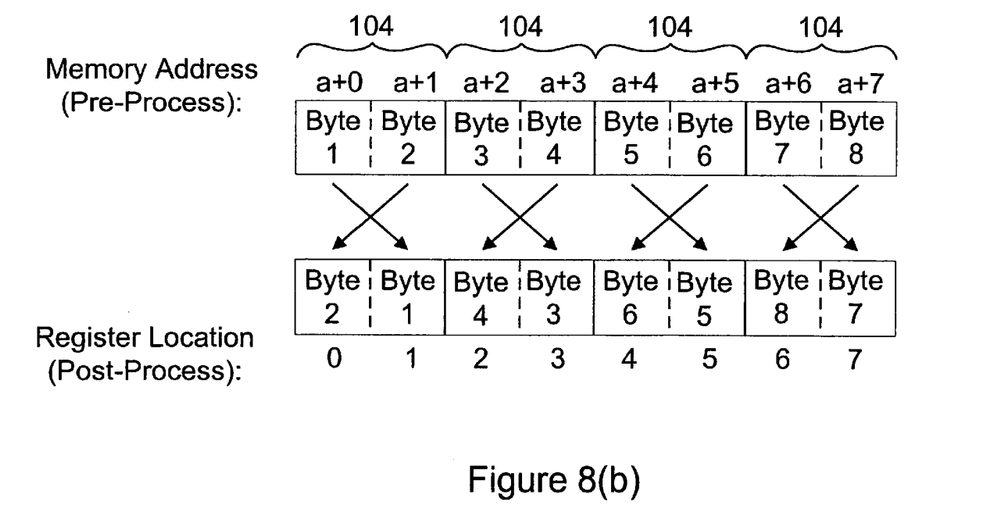

In a preferred embodiment, such a swapping of location is accomplished using the method discussed above. The first vector element, consisting of the first two bytes, is processed first. Within the first vector element, the bytes are processed in reverse order; the byte in the second memory address is processed first, then the byte in the first memory address. Because the bytes go into each register location in the order of processing, this results in the byte in the second memory address going to the first register location and the byte in the first memory address going to the second register location. The other vector elements are similarly processed in order, with the bytes within each vector element being processed in reverse order. By processing the bytes in this manner, the position of the bytes are swapped between the memory addresses and register locations as shown in FIG. 8(*b*).

FIG. 8(*c*) shows the location of vector data in memory and the corresponding location of the vector data in the register for a 64-bit vector having two vector elements 104 of four bytes each. As seen in FIG. 8(*c*), the first vector element 104 is located at the first four memory addresses. The bytes within the first vector element 104 go to the first four locations of the register, although in reverse order. The byte at the first memory address goes to the fourth register location, the byte at the second memory address goes to the third register location, the byte at the third memory address goes to the second register location, and the byte at the fourth memory address goes to the first register location. Similarly the second vector element 104 is located at the last four memory addresses, and remains in the last four locations of the register. The bytes within the second vector element 104 swap order as shown in FIG. 8(*c*), just as the bytes in the first vector element 104 swap order.

Figure 8C:
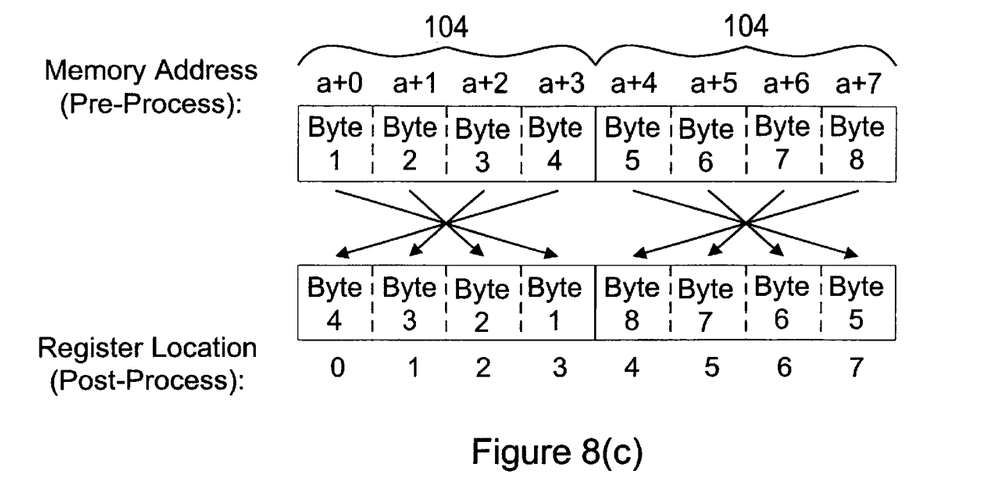
Figure 8D:
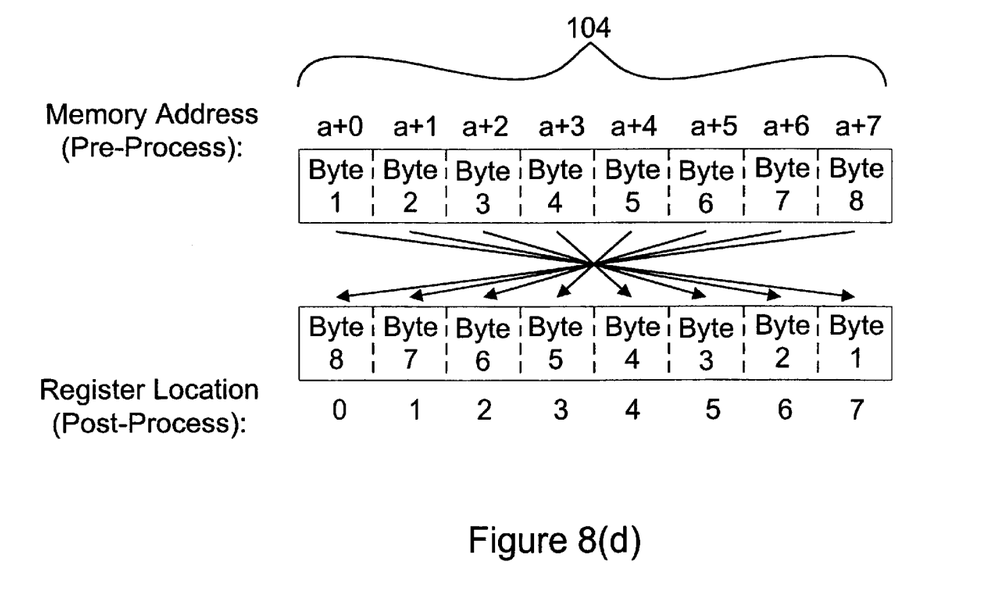

Again, in a preferred embodiment, such a swapping of location is accomplished using the method discussed above. The vector elements are processed in order, from first to last, and the bytes within each vector element are processed in reverse order, from last to first. The bytes go into each register location in the order of processing. Since the method results in the byte in the fourth memory address being processed first, it results in the byte in the fourth memory address going into the first register location. It further results in the rest of the bytes going into the memory locations shown in FIG. 8(*c*).

FIG. 8(*d*) shows the location of vector data in memory and the corresponding location of the vector data in the register for a 64-bit vector having one vector element 104 of eight bytes. In such a case, since there is only one vector element 104, the bytes are simply put in reverse order. Essentially, the bytes swap order, as shown in FIG. 8(*d*). Again, in a preferred embodiment, the swapping is accomplished using the method discussed above.

Note that, depending on the system architecture, the system could reverse the treatment of big endian and little endian data. The system would treat the big endian and little endian data in an opposite manner. In such a case, if the vector data were big endian, the vector data would be remain in the same order in a load/store operation, starting at the first data address and continuing to the last address. If the vector data were little endian, the location of data would be swapped, with the data within each vector element being reversed in order.

We claim:

1. A computer-implemented method for processing vector data, the vector data containing at least one vector element, each vector element containing at least one small data unit, comprising:

determining whether the vector data has a first order or a second order;

if the vector data has the first order, processing each vector element in order, starting with the first vector element, and processing each small data unit within each vector element in order, starting with the first small data unit of each vector element; and if the vector data has a second order, processing each vector element in order, starting with the first vector element, and processing each small data unit within each vector element in reverse order, starting with the last small data unit in the vector data.

2. The method of claim 1, wherein the first order is a little endian order.

3. The method of claim 2, wherein the second order is a big endian order.

4. The method of claim 1, wherein the first order is a big endian order.

5. The method of claim 1, wherein the vector data contains at least two vector elements.

6. The method of claim 1, wherein the vector data contains 8 bytes.

7. The method of claim 1, wherein the small data unit is a byte.

8. The method of claim 1, wherein each vector element contains at least two small data units.

9. The method of claim 1, further comprising determining the number and size of vector elements contained in the vector data.

10. A method for moving vector data from a set of memory addresses to a set of registers, the registers having a first order, the vector data containing at least one vector element, each vector element containing at least one small data unit, comprising:

determining if the vector data in the set of memory addresses has the first order or a second order;

if the vector data in the set of memory addresses has the first order, placing the small data unit from the first memory address in the first register, and placing each small data unit from each next higher memory address in each next higher register; and if the vector data in the set of memory addresses has a second order, placing each vector element into the registers in order, and placing each small data unit within the vector element into the registers in reverse order.

11. The method of claim 10, wherein the first order is a little endian order.

12. The method of claim 11, wherein the second order is a big endian order.

13. The method of claim 10, wherein the first order is a big endian order.

14. The method of claim 10, wherein the vector data contains at least two vector elements.

15. The method of claim 10, wherein the small data unit is a byte.

16. The method of claim 10, further comprising determining the number and size of vector elements contained in the vector data.

17. A computer processor capable of correctly treating both a first order of vector data and a second order of vector data, the vector data containing at least one vector element, each vector element containing at least one small data unit, the processor having instructions for:

determining whether the vector data has the first order or the second order;

if the vector has the first order, processing each vector element in order, starting with the first vector element, and processing each small data unit within each vector element in order, starting with the first small data unit of each vector element; and if the vector data has the second order, processing each vector element in order, starting with the first vector element, and processing each small data unit within each vector element in reverse order, starting with the last small data unit in the vector.

18. The computer processor of claim 17, wherein the first order is a little endian order.

19. The computer processor of claim 18, wherein the second order is a big endian order.

20. The computer processor of claim 17, wherein the first order is a big endian order.

21. The computer processor of claim 17, wherein the vector data contains at least two vector elements.

22. The computer processor of claim 17, wherein the vector data contains 8 bytes.

23. The computer processor of claim 17, wherein the small data unit is a byte.

24. The computer processor of claim 17, wherein each vector element contains at least two small data units.

25. The computer processor of claim 1, further comprising instructions for determining the number and size of vector elements contained in the vector data.

26. A method for moving vector data from a first set of addresses to a second set of addresses, the second set of addresses having a first order, the vector data containing at least one vector element, each vector element containing at least one small data unit, comprising:

determining if the vector data in the first set of addresses has the first order or a second order;

if the vector data in the first set of addresses has the first order, placing the small data unit from the first address of the first set of addresses in the first address of the second set of addresses, and placing each small data unit from each next higher address of the first set of addresses in each next higher address of the second set of addresses; and if the vector data in the first set of addresses has a second order, placing each vector element into the second set of addresses in order, and placing each small data unit within the vector element into the second set of addresses in reverse order.

27. The method of claim 26, wherein the first order is a little endian order.

28. The method of claim 27, wherein the second order is a big endian order.

29. The method of claim 26, wherein the first order is a big endian order.

30. The method of claim 26, wherein the vector data contains at least two vector elements.

31. The method of claim 26, wherein the small data unit is a byte.

32. The method of claim 26, further comprising determining the number and size of vector elements contained in the vector data.

33. The method of claim 26, wherein the first set of addresses is a set of memory addresses.

34. The method of claim 26, wherein the second set of addresses is a set of registers.

35. The method of claim 26, wherein the first set of addresses is a set of registers.

* * * * *